United States Patent
Strauss

[15] 3,668,930
[45] June 13, 1972

[54] PARAMETER READ-OUT SYSTEMS FOR PRESSURE-FREQUENCY TRANSDUCERS

[72] Inventor: George M. Strauss, Elmhurst, N.Y.
[73] Assignee: Kollsman Instrument Corporation, Syosset, N.Y.
[22] Filed: March 24, 1971
[21] Appl. No.: 127,462

[52] U.S. Cl. .................................. 73/386, 73/398 R
[51] Int. Cl. ........................................... G01l 7/12
[58] Field of Search ............... 73/398 R, 407, 410, 384, 386, 73/387, 71.5; 335/222, 226; 331/65

[56] References Cited

UNITED STATES PATENTS 2,949,779  8/1960  McKenney et al. .................. 73/384
3,503,263  3/1970  Intraub ............................... 73/386

Primary Examiner—Donald O. Woodiel
Attorney—E. Manning Giles, J. Patrick Cagney, Michael A. Kondzella and Richard A. Zachar

[57] ABSTRACT

Read-out systems which respond to an input signal having a frequency value that is variable with pressure to provide read-out of parameters having a non-linear relationship to the frequency of the input signal employ digital circuits operable to generate pulse count proportional to the logarithm of the period of the transducer frequency. Depending upon the specific parameter to be read-out, appropriate modifying circuitry modifies the count, with or without memory units, to develop an output read-out signal.

20 Claims, 9 Drawing Figures

PARAMETER READ-OUT SYSTEMS FOR PRESSURE-FREQUENCY TRANSDUCERS

The present invention relates generally to read-out systems and, more particularly, relates to systems for converting measurements of frequency period of a pressure-frequency transducer such as is described in Intraub, U.S. Pat. No. 3,503,263 entitled SONIC ALTIMETER and in copending Intraub application Ser. No. 125,577 filed Mar. 18, 1971, and entitled SHORTED TURN AXIAL DRIVER-SENSOR to read-out of parameters such as pressure or altitude.

As explained in the foregoing patent and application (the disclosures of which to the extent not inconsistent herewith are specifically incorporated herein by this reference), with changing pressure the walls of an aneroid capsule are deflected and this deflected shape establishes the natural frequency of the capsule. The natural frequency then can be measured to determine parameters such as pressure and altitude.

Accurate reduction of measurements of transducer frequency to read-out of altitude or pressure, however, is somewhat complex as a consequence of the highly non-linear functional relationships existing between altitude and transducer frequency and between pressure and transducer frequency.

In a conventional technique which can be utilized to obtain read-out of the desired parameter from measurements of transducer frequency, a read only memory (ROM), storing altitude or pressure as a function of transducer frequency period for a series of specific frequency periods is addressed by the more significant digits of count (parallel binary) representative of transducer frequency period. The less significant digits of the count are used to perform interpolation to thereby obtain output (digital) approximating altitude or pressure. In this connection a system using a ROM to store discrete values of an arbitrary function and time-averaging interpolation is described in an article by Herman Schmid and David Busch entitled "Generate functions from discrete date," *Electronic Design* 20, Sept. 27, 1970. The difficulty with this general approach resides in the relatively large amount of memory storage capacity that the ROM must have (due to the degree of non-linearity of the function to be generated) in order to provide highly accurate output.

SUMMARY OF THE INVENTION

In accordance with the present invention a system for reducing a measurement of frequency of a pressure-frequency transducer to read-out of a parameter such as altitude or pressure includes digital circuitry operable to generate pulse count proportional to the logarithm of the period of the transducer frequency.

In certain of the embodiments illustrated herein this pulse count is modified by suitable circuitry, without memory, to obtain approximate read-out of pressure or altitude.

In other illustrated embodiments, this pulse count is modified by suitable circuitry to derive an approximate parameter representative value. This value in parallel digital format is used to address a memory storing accurate parameter representative value as a function of derived parameter representative value for a series of such derived values.

The parameter representative values may, but need not, be equivalent to the actual parameter value. Thus, in an illustrated pressure read-out embodiment the parameter representative values are values representative of the natural logarithm of pressure.

Since accurate parameter representative value as a function of derived parameter representative value is much more linear than actual parameter value as a function of the period of transducer frequency, much less memory storage capacity is required to achieve a given degree of read-out accuracy as compared with the conventional technique described above.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same.

DETAILED DESCRIPTION

Figure 1:
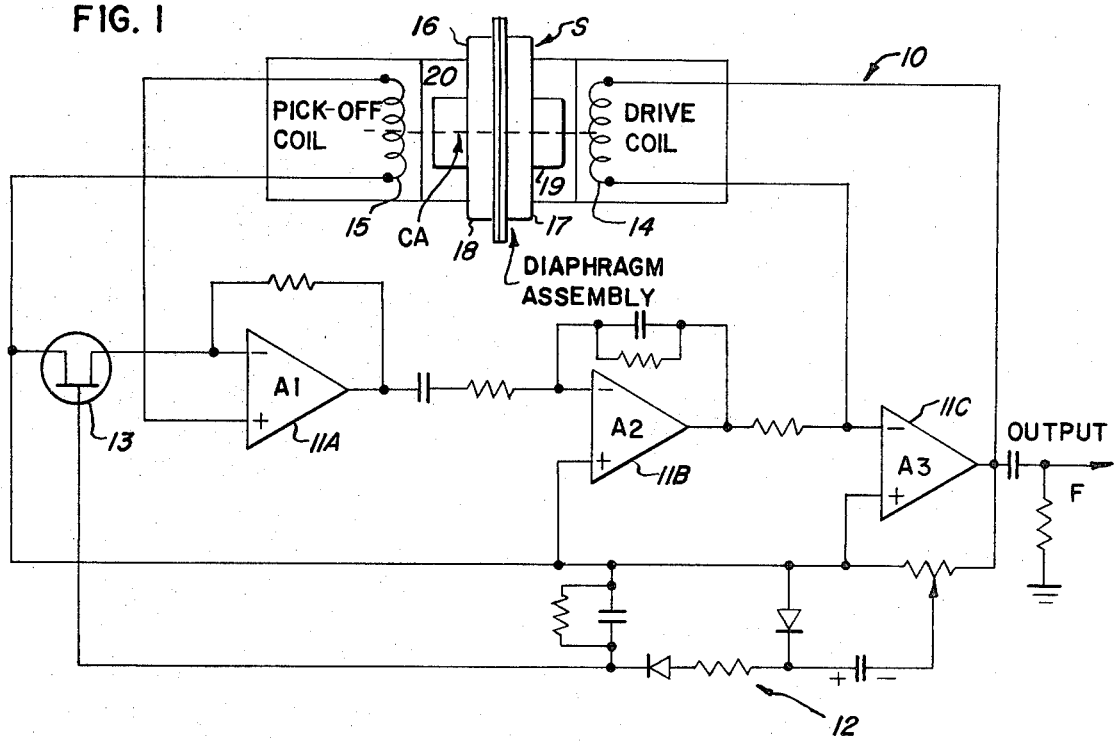
FIG. 1 is a schematic diagram of a pressure-frequency transducer, the frequency output of which is to be reduced to read-out of a parameter in accordance with the present invention.

Referring now to the drawings, for purposes of complete illustrative disclosure, a schematic diagram of a pressure transducer 10, the frequency of which is to be reduced to read-out of altitude or pressure in accordance with the present invention, is shown in FIG. 1 as including a pressure responsive sensor S connected as the frequency controlling element in the positive feedback path of a composite amplifier arrangement comprising three separate amplifiers 11A, 11B and 11C, connected in series to provide the required gain, phase and current drive for enabling sustained oscillation.

An AGC detector circuit 12 is connected to rectify and peak detect the voltage output from the current drive amplifier 11C and is connected to supply feedback voltage to an FET 13 for controlling the variable gain amplifier 11A which is AC coupled to the phase shift amplifier 11B to eliminate DC drift. The phase shift amplifier 11B compensates for phase shift through the feedback path that includes the sensor S. Amplifier 11C generates a current waveform to energize a drive coil 14 that actuates the sensor S. A pickup coil 15 is connected to supply input to the amplifier 11A at a frequency preferentially determined by the resonance characteristic of the sensor S. The composite gain of the arrangement, as controlled by the AGC circuit 12, maintains each amplifier in a linear region for producing a sinusoidal waveform.

The sensor S shown in FIG. 1 incorporates a sealed aneroid capsule 16 of the standard electron beam welded construction commonly used in altimeters. The aneroid capsule 16 is mounted to operate essentially under no-load conditions such that its resonant frequency vibration is a function of the differential gas pressure between the interior (vacuum) and the exterior of the capsule.

In the schematic arrangement of FIG. 1, the capsule 16 has mating diaphragm walls 17, 18. The wall 17 carries an electromagnetic element 19 acting as a shorted turn encircling the axis A and electromagnetically coupled to the drive coil 14 of the current drive amplifier 11C that supplies energy necessary to maintain a predetermined amplitude of vibration for the diaphragm wall. The mating diaphragm wall 18 carries an electromagnetic element 20 acting as a shorted turn electromagnetically coupled to the pickup coil 15.

When the circuit is energized, the transients in the output circuit of amplifier 11C act to drive the diaphragm wall 17. The tuning fork action of the capsule 16 causes the companion diaphragm wall 18 to move in opposing synchronism along a common central axis CA. The diaphragm walls 17, 18 tend to vibrate at a resonant frequency determined by the pressure differential acting upon each and act to produce a positive feedback for supporting oscillation at that resonant frequency. Accordingly, the signal frequency at the output terminal of the drive amplifier 11C is a measure of the gas pressure to which the capsule is subjected.

Figure 2:
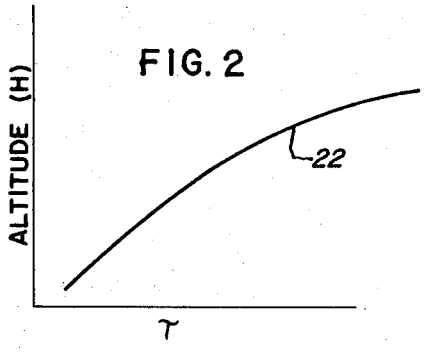
FIGS. 2 to 5 are graphs illustrating in simplified form various relationships between frequency period of the transducer of FIG. 1 and parameters of pressure and altitude.
Figure 3:
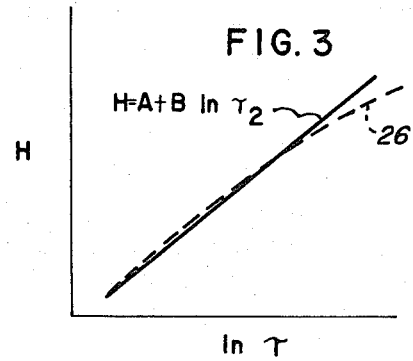
Figure 4:
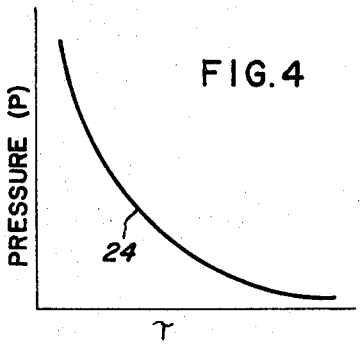
Figure 5:
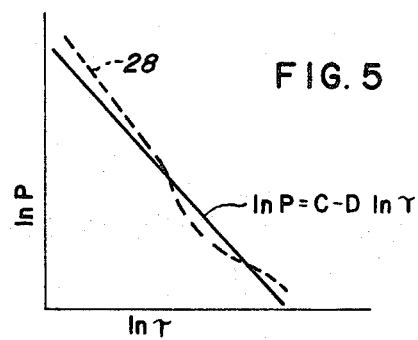

As stated above, the present invention is concerned with reducing the transducer frequency output to readouts of parameters such as altitude or pressure. In this connection, curves 22 and 24 of FIGS. 2 and 4, respectively, illustrate the highly non-linear relationships of the type typically existing between the frequency period $\tau$ of transducer 10, altitude H and pressure P. As stated above, because of the non-linearity, direct conversion of frequency or frequency period $\tau$ to altitude or pressure necessitates systems having large memory storage capacity. Dotted curves 26 and 28 of FIGS. 3 and 5, respectively, illustrate, however, that the relation between the natural logarithm of frequency period ($\ln \tau$) is more nearly linear with altitude and with the natural logarithm of pressure ($\ln P$), and that such characteristics of the transducer can be idealized (as indicated by the solid curves 30 and 32 of FIGS. 3 and 5, respectively), by the expressions:

$$H = A + B \ln \tau \quad (1)$$
$$\ln P = C - D \ln \tau \quad (2)$$

where $H$ is altitude, $P$ is pressure, $\tau$ is the frequency period of the transducer, and $A$, $B$, $C$ and $D$ are constants which depend upon the characteristics of the specific pressure sensor S of the transducer 10.

ALTITUDE READ-OUT EMBODIMENTS

Figure 6:
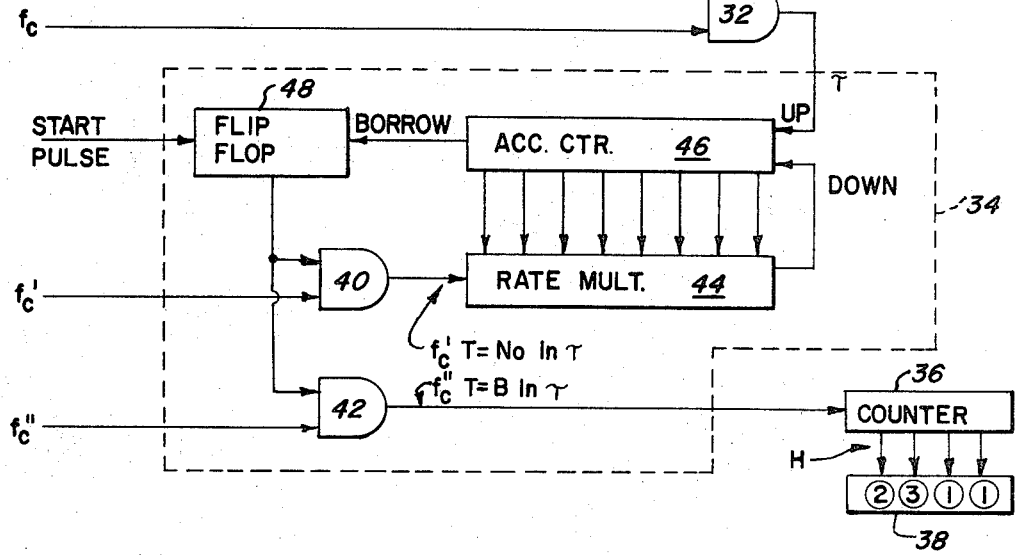
FIG. 6 is a schematic circuit diagram of a read-out system for reducing measurements of frequency period to read-out of altitude in accordance with the present invention.

Referring now to FIG. 6 an embodiment of the invention is shown for reducing measurements of the natural frequency of a pressure-frequency transducer to read-out of altitude. The altitude read-out embodiment of FIG. 6 includes a pressure transducer 10 providing an input frequency variable signal F of sinusoidal waveform. In the illustrated embodiment, the input signal F is processed through a frequency divider 30 and applied to a gate 32. The frequency divider provides integration for minimizing the effects of noise and jitter in the waveform of the input signal. Clock pulses $f_c$ are applied at an input terminal that is connected to the gate 32. Thus, the output signal of gate 32 consists of a number of clock pulses determined by and representative of the period ($\tau$) and, more specifically, a number of clock pulses equal to $Ef_c\tau$ where E is the number of frequency cycles of the transducer output necessary to provide a single output cycle from frequency divider 30, of the transducer frequency F. This signal representative of period is applied as one of the inputs to a digital circuit 34 which, as will be described in detail below, operates to generate, as output, pulse count linearly related to the logarithm of the period of transducer frequency. In the illustrated embodiment of FIG. 6, this output pulse count augments a counter 36 (the output of which is altitude H in parallel binary format) which drives a decimal altitude read-out unit 38.

As will be discussed in greater detail below, the pulse count generated or derived by digital circuit 34 defines an approximate parameter representative value. In the altitude embodiment of FIG. 6, such value is $B \log_e \tau$ (see Equation (1)). Thus, to obtain read-out of altitude (ideal), counter 36 is preset to the number $A$ (Equation (1)) so that its output is $A + B \log_e \tau$.

In the illustrated embodiment digital circuit 34 comprises a pair of AND gates 40 and 42. Clock pulses $f_c'$ are applied at an input terminal that is connected to the gate 40 and clock pulses $f_c''$ are applied at an input terminal that is connected to the gate 42. In the manner to be described, these gates 40 and 42 are controlled so as to admit clock pulses $f_c'$ and $f_c''$, respectively, for a time period T that is linearly related to the logarithm of the period $\tau$ of the transducer frequency F. The number of pulses admitted by gates 40 and 42 in such time span can be expressed as $f_c'T$ and $f_c''T$, respectively, and are, therefore, also linearly related to the logarithm of the transducer frequency period $\tau$. And, the output of gate 42, a pulse count $f_c''T$, is the approximate parameter representative value equals $B \log_e \tau$.

Gates 40 and 42 are controlled through operation of a rate multiplier 44 which is connected to receive clock pulses $f_c'$ admitted by gate 40 and which has its output connected to the DOWN input of an accumulating counter 46 that is connected with the rate multiplier to provide count (integral) feedback. In the illustrated embodiment, the accumulating counter 46 is provided with stages capable of UP-DOWN counting, the UP input of which is connected to receive the output of gate 32 which, as stated above, is a pulse train representative of the period $\tau$ of the frequency F of transducer 10. The BORROW output of counter 46 is connected to the reset input of a flip-flop 48, the Q output of which is connected to gates 40 and 42. From the foregoing it will be evident to those skilled in the art that it, after an output pulse train from gate 32 is loaded or run into the UP input of counter 46 and such UP input thereafter disenabled, a START PULSE is introduced to the set input of flip-flop 48 (thereby enabling gates 40 and 42), a BORROW pulse, resetting flip-flop 48 and disenabling gates 40 and 42, will be generated by counter 46 after a time interval that is proportional to the natural logarithm of the count accumulated by counter 46 during the load interval. Since this count, as stated above, is representative of the transducer frequency period $\tau$, the number of pulses admitted by gates 40 and 42 during the time interval are linearly related to $\log_e \tau$. Actually, the output pulse count from gate 40 is $N_o \log_e \tau$ where $N_o = 2^n$, $n$ being the number of stages in the rate multiplier 44 and in the accumulating counter 46. Clock frequency $f_c''$, hence, is carefully chosen in accordance with the relation $$f_c'' = (B/N_o) f_c'$$

so that the output pulse count of gate 42 is $B \log_e \tau$.

Summarizing, in operation a START PULSE (generated within system timing circuits) sets flip-flop 48, whose output enables AND gates 40 and 42, thereby admitting clock frequency $f_c'$ pulses to rate multiplier 44 and clock frequency $f_c''$ pulses to counter 46. At the instant of start, the rate multiplier output frequency is at maximum, proportional to the number to which counter 46 has been preset and it decreases exponentially as the counter 46 is run down. As the output of accumulator counter 46 goes to zero, a BORROW pulse is generated and is used to reset flip-flop 48, closing gates 40 and 42. Assuming gate 32 is operable over a single cycle of transducer frequency ($E=1$), the time duration of the gate is given by $$T = (N_o/f_c') \ln \tau \quad (3)$$

and the total number of clock pulses (i.e., pulse count) admitted to rate multiplier 44 and to counter 36 before the accumulator counter 46 is run down to zero, closing the gates 40 and 42 are respectively:

$$\left. \begin{array}{l} f_c'T = N_0 \ln \tau \quad \text{and} \\ \\ f_c''T = f_c' \dfrac{B}{N_0} T = B \ln \tau \end{array} \right\} \quad (4)$$

As stated above, altitude is (ideally) given by
$$H = A + B \ln \tau \quad (5)$$
so that the pulse count $f_c''T$ output of digital circuit 34 defines an approximate parameter (i.e., altitude) representative value in the altitude embodiment of FIG. 6 is modified through operation of counter 36 directly to approximate altitude H.

It will be understood that digital circuit 34 can take numerous forms. Thus, for example, the output of gate 32 can be counted in a separate counter so that counter 46 need not be provided with stages for UP-DOWN counting. In such case the output of counter 46 need be compared with the register storing such count. It should also be noted that clock pulses $f_c$, rather than clock pulses $f_c'$, could be also used as input to gate 40 and that gate 42 can be eliminated (as well as clock pulse $f_c''$) by connecting the output of gate 40 to counter 36 as well as to the rate multiplier 44. In such case, of course, a scaler unit would have to scale the output of gate 40 to accomplish conversion of the output pulse count ($N_o \ln\tau$) to pulse count defining the approximate parameter representative value ($B \ln\tau$).

In the illustrated embodiment of FIG. 6 gate 32 is described as functioning to produce an output pulse train representing a single cycle of transducer frequency so that the number of admitted pulses represents period $\tau$. If a greater number of frequency cycles is used, Equations (4) would be as follows:

$$\left. \begin{array}{l} f_c'T = N_0 \ln E + N_0 \ln\tau \\ f_c''T = B \ln E + B \ln\tau \end{array} \right\} \quad (4^*)$$

where $E$ is the number of frequency cycles. Thus, it can be seen that by careful choice of $E$, the output of digital circuit 34 can be made equal to $A + B \ln\tau$. In such case, of course, the pulse count defining the approximate parameter representative value also defines the actual approximate parameter value $H$.

Where the idealization is not sufficiently good (i.e., the departure of true altitude from values produced by the idealized expression for H exceeds permissible error for the particular application), the output pulse count of digital circuit 34 is utilized to address memory. Thus in FIG. 6B the output pulse count $f_c''T$ is accumulated in a counter 50. The more significant digits of the register of counter 50 are used to address a read only memory (ROM) unit 52 storing true altitude as a function of pulse count $f_c''T$ (i.e., the parameter representative value) for a series of specific values of $f_c''T$. In this connection it will be appreciated that since the relation of true altitude vs. $f_c''T$ approaches linearity far more closely than that of true altitude vs. transducer period the number of points stored in ROM 52 can be much smaller than the number required for equivalent accuracy if the memory is addressed on the basis of transducer period. The less significant digits of the $f_c''T$ count are indicative of how far into the specific segment (between discrete stored points) the actual reading extends, and it is used to perform the interpolation. This may be done on the basis of time averaging (see in this regard Schmid and Busch, "Generate Functions from discrete data," *Electronic Design* 20, Sept. 27, 1970), or by use of stored slope. In the latter case, slope $M = \Delta$ *true altitude*$/\Delta$ ($f_c''T$) is multiplied by excess count $\delta f_c''T$ to yield increment over the last stored discrete true altitude value. Either way, standard methods of interpolation can be used.

Figure 6A:
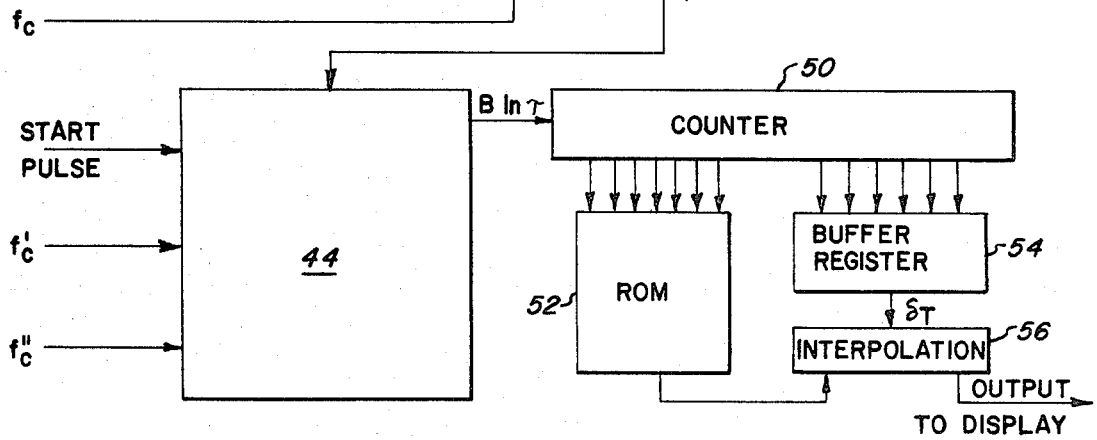
FIG. 6A is a schematic diagram of an altitude read-out system which incorporates memory in accordance with the present invention.

In the illustrated arrangement of FIG. 6A which utilizes the stored-slope method, ROM 52 stores true altitude $H_i$ for each of the calibration points (as identified by their individual addresses) and differential altitude to the next higher altitude $\Delta H = H_{i+1} - H_i$. The buffer 54 is used as temporary storage for the excess count $\delta f_c''T$, so that a new count may be accumulated while the old one is being used. The interpolation box 56 contains circuits which permit generation of a pulse train representative of true altitude at the claibration point, $H_i$ pulses and the additional altitude calculated upon the basis of stored $\Delta H$ and $\delta f_c''T$. $H_i$ pulses are generated by presetting a counter with ROM output number $H_i$ and running it down by means of a clock. Subsequently, a time interval,$\Delta H$/clock frequency, is generated in like manner, and it is used to gate a frequency proportional to $\delta f_c''T$ produced by a rate multiplier; the number of pulses passed through equals the additional altitude about $H_i$. The sum of the number of pulses represents total altitude $H$. Smoothing may be accomplished by appropriate scaling (pulse per unit of altitude) and subsequent count down.

PRESSURE READ-OUT EMBODIMENTS

The idealized transducer characteristic in the case of pressure is, as stated above, of the form:

$$\ln p = C - D \ln\tau \quad (2)$$

Figure 7:
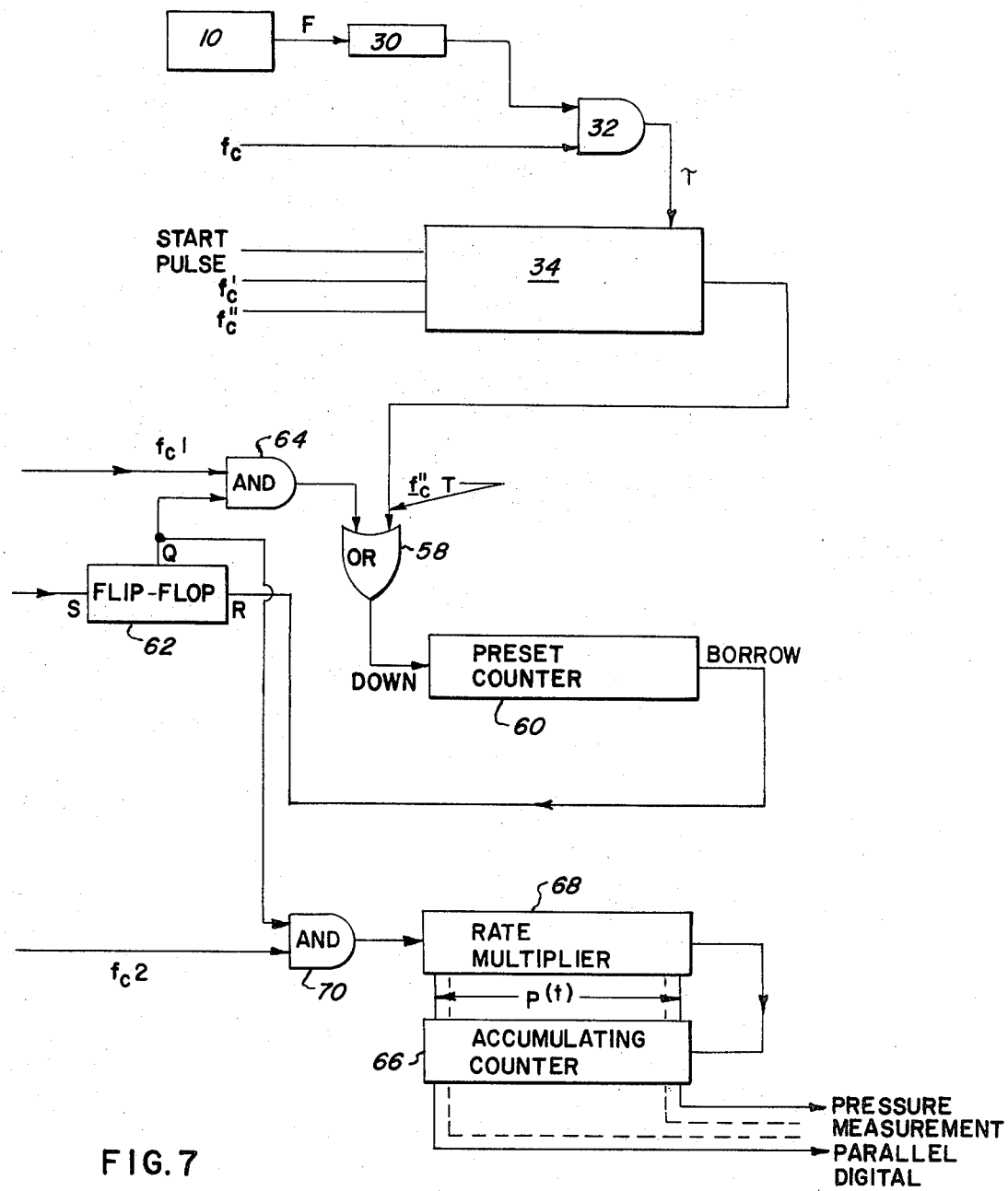
FIG. 7 is a schematic circuit diagram of a read-out system for reducing measurements of frequency period to read-out of pressure in accordance with the present invention.

FIG. 7 illustrates in block-diagram form an embodiment of the invention for reducing measurements of frequency period to read-out of pressure in the case where the ideal relationship yields results of adequate accuracy. In FIG. 7, a pulse count $f_c''T$ derived by digital circuit 34 in the same manner as described above with reference to FIG. 6 is fed through OR gate 58 to the DOWN input of a counter 60 preset to the number $C$ (obtained from calibration data). In the embodiment of FIG. 7, clock frequency $f_c''$ is chosen in accordance with the relation $$f_c'' = f_c' \frac{D}{N_0}$$

so that the counter 60 stores an approximate parameter representative value $C - D \cdot \text{Ln}(\tau)$. The time interval required to reduce the counter 60 reading to zero by means of a fixed clock is proportional to Ln $p$. In the illustrated embodiment, such an interval is generated by applying an appropriate pulse to set a flip-flop 62, admitting clock frequency $f_{c1}$ to the preset counter 60 storing Ln $p$, via AND gate 64 and OR gate 58. A BORROW pulse, generated when the counter reading goes through zero, resets flip-flop 62, ending the gate waveform.

An exponential generator consisting of a rate multiplier 68 and an accumulating counter 66 connected to provide rate multiplier 68 with cummulative count, converts Ln $p$ to $p$. This is accomplished in the illustrated embodiment by using the gating waveform, whose duration is proportional to Ln $p$, to control transmission through AND gate 70 of clock frequency $f_{c2}$ to rate multiplier 68. Counter 66 is, of course, preset to 1 (otherwise the circuit would be unable to start). At the end of interval Ln·$p$, the counter reading of counter 66 is directly proportional to pressure (ideal) and, for proper choice of $f_{c2}$, it can be direct-reading in desirable units. The output is as indicated, of parallel digital format.

For applications where the idealization $p = \exp. (C - D \cdot \text{Ln}\tau$) falls short of the desired accuracy, memory can be incorporated. Thus, in FIG. 7A, the quantity stored in the counter 60 preset to $C$, ($C - D \cdot \text{Ln}\tau$), which was previously taken as equal to ln $p$ is now considered to be "approximate ln $p$". Actual Ln $p$ as a function of "approximate Ln $p$" is stored in a memory unit 72. Since the relation between these two quantities departs from linearity to a much lesser degree than that between $\tau$ and $P$, the amount of memory capacity required to achieve any arbitrary degree of conformity will be much smaller as compared with memory storing true pressure as a function of $\tau$. In FIG. 7B the preset counter 60 acquires its storage of "approximate Ln $p$" in the same manner as that of FIG. 7. Its higher-order bits are used to address memory 72 (which, as suggested above, has been programmed to store true ln $P$ as a function of "approximate Ln·$p$" using an appropriate number of segments), and the lower-order bits constitute the abscissa for interpolation within each segment. Interpolation is performed in the manner described with reference to FIG. 6A by use of time-averaging, or on the basis of stored slope.

The output of the interpolation box 74, a train of pulses equal in number to the true logarithm of pressure (in appropriate units) is connected to the UP input of a counter 76. To obtain read-out pressure, clock input $f_{c3}$ is applied at a terminal that is connected to one input of an AND gate 78, the output of which is connected to the DOWN input of counter 76. A start pulse is applied at an input terminal connected to the set input of a flip-flop 80 which is connected to receive at its reset input a BORROW pulse from counter 76, with the Q output of the flip-flop being connected to the AND gate 78 and to an AND gate 82. AND gate 82 is connected to receive clock input $f_{c4}$ that is applied at an input terminal. Since counter 76 is loaded to the digital number ln $P$, the time duration between the start pulse and BORROW pulse is proportional to Ln $P$ and, hence, AND gate 82 will admit clock pulse input $f_{c4}$ for such time span. The output of AND gate 82 is connected as input to a rate multiplier 84. The output of rate multiplier 84 is connected to the UP input of an accumulating counter 86 which is, in turn, connected to provide gain controlling count feedback to rate multiplier 84. Thus, since clock input $f_{c4}$ is admitted to rate multiplier 84 for a time period proportional to ln $P$, the accumulated count of counter 86 after such time period is exp. ln $P$ or $P$. Output of counter 86 is in the form of a parallel digital number.

Figure 7A:
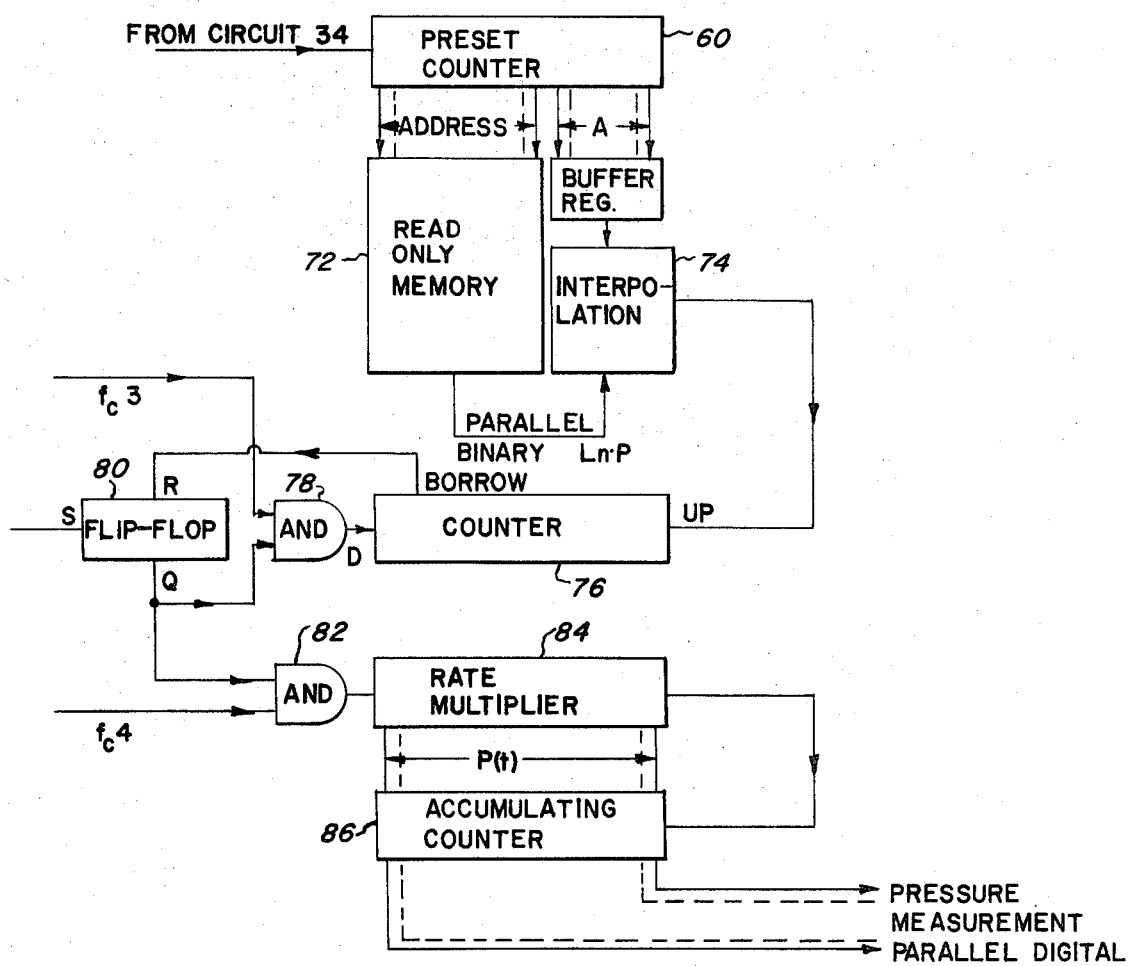
FIG. 7A is a schematic diagram of a pressure read-out system which incorporates memory in accordance with the present invention.

Although in the embodiment of FIG. 7A, memory storing true Ln $P$ as a function of derived or approximate ln $P$ is addressed (i.e., memory is addressed with derived parameter representative values so as to provide true parameter representative values), it will be understood that the embodiment of FIG. 7 can be augmented with memory storing true $P$ as a function of derived $P$. In such case the output of counter 66 would be exploited to address such memory.

Thus, while preferred constructional features of the invention are embodied in the structure illustrated herein, it is to be understood that changes and variations may be made by those skilled in the art without departing from the spirit and scope of the appended claims. For purposes of clarity, the expression Kln$M\tau$ used in the claims is a generalized expression descriptive of the value of the output signal of circuit 34 variously described above as $N_o$ ln$\tau$, Bln$\tau$, $A + B\ln\tau$, $N_o \ln E\tau$, $D\ln\tau$ and $D \ln E\tau$. The expression $K' + K\ln M\tau$ is a generalized expression descriptive of the value of the output signal of circuit 34 following arithematical modification thereof such as by counter 36 and counter 60.

What is claimed is:

1. In a system that includes a transducer responsive to pressure to produce an input signal having a frequency value that is variable with pressure, a read-out arrangement responsive to said input signal for producing read-out of a parameter having a non-linear relationship to the frequency of the input signal, said arrangement including first means responsive to said input signal for generating a control signal having a value representative of the period corresponding to the frequency of said input signal, second means responsive to said control signal for producing an output signal having a value linearly related to the logarithmic value of said control signal, and third means utilizing said output signal for producing read-out of the parameter.

2. In a system in accordance with claim 1 wherein said third means includes memory means responsive to said output signal to provide a memory corrected output signal, and means responsive to said memory corrected output signal for producing read-out of the parameter.

3. In a system in accordance with claim 1 wherein said transducer is responsive to atmospheric pressure, wherein said parameter is altitude, and wherein said second means produces said output signal having a value H given by the equation $$H = A + B \ln\tau$$

where $H$ is a variable approximately equal to altitude, ln $\tau$ is the natural logarithm of said period corresponding to the frequency of said input signal, and $A$ and $B$ are predetermined constants.

4. In a system in accordance with claim 3 wherein said third means includes memory means responsive to said output signal to provide a memory corrected output signal representative of altitude, and means responsive to said memory corrected output signal for producing read-out of altitude.

5. In a system in accordance with claim 1 wherein the value of said control signal is $M\tau$ where M is a scalar quantity and $\tau$ is the period corresponding to the frequency of said input signal, wherein the value of said output signal is Kln ($M\tau$) where K is a constant, and wherein said third means includes means for arithematically modifying said output signal to produce a modified output signal having a value equal to $K +$ Kln($M\tau$), where $K'$ is a constant.

6. In a system in accordance with claim 5 wherein said transducer is responsive to atmospheric pressure, wherein said parameter is altitude, and wherein the scalar M and the constants K and K' are such that the value of said modified output signal approximately equals altitude in accordance with the equation $$H = A + B\ln\tau$$

where $H$ is a variable that approximately equals altitude and $A$ and $B$ are predetermined constants.

7. In a system in accordance with claim 6 wherein said third means further includes memory means responsive to said modified output signal to provide a memory corrected output signal representative of altitude.

8. In a system in accordance with claim 5 wherein said parameter is pressure and wherein the scalar M and the constants K and K' are such that the value of said modified output signal is approximately equal to the logarithmic value of pressure $P$ in accordance with the equation $$\ln P = C - D\ln\tau$$

where $P$ is a variable that approximately equals pressure and $C$ and $D$ are predetermined constants.

9. In a system in accordance with claim 8 wherein said third means further includes memory means responsive to said modified output signal to provide a memory corrected output signal representative of the natural logarithmic value of pressure.

10. In a system in accordance with claim 9 wherein said third means further includes means responsive to said memory corrected output signal to provide a final signal representative of pressure.

11. In an indicating system for indicating the value of a parameter that varies in accordance with pressure, the combination comprising a transducer responsive to pressure to produce an input signal having a frequency that is variable with pressure, means responsive to said input signal for producing an output signal having a value that is linearly related to the logarithmic value of the period of the frequency of said input signal, and utilization means responsive to said output signal for producing a final signal having a value representative of said parameter.

12. In an indicating system in accordance with claim 11 wherein said utilization means includes memory means for providing a memory corrected output signal in response to its input, and means responsive to said output signal for generating the memory means input.

13. In an indicating system in accordance with claim 11 wherein the output signal producing means includes means for providing a clock pulse train, gating means for gating said pulse train, and means for rendering said gating means operable to admit said pulse train for a time span that is linearly related to said logarithmic value of the period of the frequency of said input signal whereby the number of pulses of the admitted pulse train is linearly related to said logarithmic value.

14. In an indicating system in accordance with claim 13 wherein said means for rendering said gating means operable includes a rate multiplier and an accumulating counter connected to provide count feedback to said rate multiplier.

15. In an indicating system in accordance with claim 11 wherein the value of said output signal is Kln ($M\tau$) where M is a scalar quantity and K is a constant, and wherein said utilization means includes means for arithematically modifying said output signal to produce a modified output signal having a value equal to $K' +$ Kln ($M\tau$) where K' is a constant.

16. In an indicating system in accordance with claim 15 wherein said parameter is altitude, and wherein the scalar M and the constants K and K' are such that the value of said modified output signal approximately equals altitude $H$ in accordance with the equation $$H = A + B\ln\tau$$

where $H$ is a variable that approximately equals altitude and $A$ and $B$ are predetermined constants.

17. In an indicating system in accordance with claim 16 wherein said utilization means includes memory means responsive to said modified output signal to provide a memory corrected output signal representative of altitude.

18. In an indicating system in accordance with claim 15 wherein said parameter is pressure and wherein the scalar M and the constants K and K' are such that the value of said modified output signal is approximately equal to the logarithmic value of pressure in accordance with the equation $$\ln P = C - D\ln\tau$$

where $P$ is a variable that approximately equals pressure and $C$ and $D$ are predetermined constants.

19. In an indicating system in accordance with claim 18 wherein said utilization means includes memory means responsive to said modified output signal to provide a memory corrected output signal representative of the logarithmic value of pressure.

20. In an indicating system in accordance with claim 19 wherein said utilization means further includes means responsive to said memory corrected signal to provide said final signal.

* * * * *